United States Patent
Bocsanyi

(10) Patent No.: US 9,545,860 B2
(45) Date of Patent: Jan. 17, 2017

(54) ADJUSTING DEVICE FOR A VEHICLE COMPONENT

(71) Applicant: SCHUKRA GERAETEBAU GMBH, Berndorf (AT)

(72) Inventor: Berthold Bocsanyi, Altdorf (DE)

(73) Assignee: SCHUKRA GERAETEBAU GMBH, Berndorf (AT)

( * ) Notice: Subject to any disclaimer, the term of this patent is extended or adjusted under 35 U.S.C. 154(b) by 273 days.

(21) Appl. No.: 14/182,184

(22) Filed: Feb. 17, 2014

(65) Prior Publication Data

US 2014/0230921 A1    Aug. 21, 2014

(30) Foreign Application Priority Data

Feb. 20, 2013    (EP) .................................... 13156014

(51) Int. Cl.
| | |
|---|---|
| *B60N 2/44* | (2006.01) |
| *B60N 2/66* | (2006.01) |
| *F04B 43/00* | (2006.01) |
| *F04B 43/02* | (2006.01) |
| *F04B 43/04* | (2006.01) |
| *F04B 45/04* | (2006.01) |
| *F04B 45/047* | (2006.01) |

(52) U.S. Cl.
CPC ............ *B60N 2/4415* (2013.01); *B60N 2/66* (2013.01); *F04B 43/0045* (2013.01); *F04B 43/021* (2013.01); *F04B 43/026* (2013.01); *F04B 43/04* (2013.01); *F04B 45/04* (2013.01); *F04B 45/047* (2013.01); *Y10T 137/3584* (2015.04)

(58) Field of Classification Search
CPC ........... B60N 2/44; B60N 2/66; B60N 2/4415; F04B 43/0045; F04B 43/021; F04B 43/026; F04B 43/04; F04B 45/04; F04B 45/047

See application file for complete search history.

(56) References Cited

U.S. PATENT DOCUMENTS

| | | |
|---|---|---|
| 2007/0217929 A1 | 9/2007 | Chiou |
| 2011/0227388 A1 | 9/2011 | Bocsanyi et al. |
| 2011/0229359 A1 | 9/2011 | Dörfler et al. |

FOREIGN PATENT DOCUMENTS

| | | | |
|---|---|---|---|
| DE | 3205859 A1 * | 10/1982 | ............... B60N 2/66 |
| DE | 44 13 657 C1 | 11/1995 | |
| DE | 100 63 478 A1 | 7/2002 | |
| DE | 10 2010 038 872 A1 | 2/2012 | |

(Continued)

OTHER PUBLICATIONS

Extended European Search Report, European Patent Application No. 13156014.6, dated Jun. 12, 2013.

*Primary Examiner* — Anthony D Barfield
(74) *Attorney, Agent, or Firm* — Michael Best & Friedrich LLP

(57) ABSTRACT

An adjusting device for a vehicle component comprises at least one inflatable chamber and a pump configured to supply fluid to the at least one inflatable chamber. The pump comprises a housing, a first output port provided on the housing and a second output port provided on the housing. At least one of the first and second output ports has an integrated check valve disposed at the respective output port. The integrated check valve is configured to receive fluid discharged from a pump chamber and is in direct fluid communication with the respective output port. The integrated check valve is arranged within the housing.

17 Claims, 5 Drawing Sheets

(56) References Cited

FOREIGN PATENT DOCUMENTS

| | | |
|---|---|---|
| EP | 1 072 465 A1 | 1/2001 |
| EP | 1201926 A2 * | 5/2002 ............ F04B 43/026 |
| EP | 2 361 800 A1 | 8/2011 |
| EP | 2 372 157 A1 | 10/2011 |
| EP | 2 461 046 A1 | 6/2012 |
| KR | 20110056990 | 5/2011 |
| WO | 98/58567 A1 | 12/1998 |
| WO | 2012016959 | 2/2012 |

* cited by examiner

ADJUSTING DEVICE FOR A VEHICLE COMPONENT

TECHNICAL FIELD

Embodiments of the invention relate to an adjusting device for a vehicle component. Embodiments of the invention relate in particular to such adjusting devices which can be used to pneumatically adjust a vehicle component, such as a vehicle seat. Embodiments of the invention relate to such adjusting devices which may be used to provide adjustable support in a vehicle seat, for example.

BACKGROUND

Vehicles include a wide variety of adjustable components. Examples include lumbar supports, side supports or other adjustable supports as well as massage units which can be provided in seats to enhance an occupant's comfort when seated on the seat. Lumbar support devices are provided in backrests in order to provide adequate support in the lumbar vertebral or lordosis region of a person sitting on the seat by forming a suitable support surface. Side supports are provided on a backrest and/or on a seat portion to provide adjustable side support. The latter may be desirable not only to accommodate varying occupant sizes, but also to actively adjust lateral support in response to centrifugal forces. Massage units may be integrated into a seat to stimulate blood circulation and/or to further enhance occupant comfort.

Some implementations of adjusting devices for vehicles use one or plural inflatable fluid chambers. The fluid chambers may be configured as inflatable cushions or bladders which change their shape and/or size in dependence on an amount of fluid contained therein. Examples for seats having lumbar support devices implemented using inflatable fluid chambers are described in EP 1 072 465 A1 or in DE 100 63 478 A1. An adjustment of the adjustable support may be effected by means of a pressure source and a suitably configured pneumatic circuit comprising valves and connecting members, such as tubes. While pneumatic elements, such as valves, may enhance life time of and/or comfort provided by the adjustable support device, such components may add to installation space and cost. EP 2 361 800 A1 describes a seat adjusting device which uses a pump with integrated valves.

In addition to installation space and cost, versatility of components used in a pneumatic adjusting device is of importance. For illustration, depending on design constraints or for other technical reasons, it may be desirable to use a pump which can be easily configured for use with a valve module which includes normally open (NO) valves. In this case, the pump should have a design which prevents leakage from inflatable chambers towards a working chamber of the pump, while still being configured for use with a wide variety of valve modules.

SUMMARY

There is a continued need in the art for adjusting devices which address some of the above needs. There is a continued need in the art for adjusting devices which are versatile in the sense that they can be used with a wide variety of control valves, while not significantly adding to number of components, construction space and costs.

According to embodiments of the invention, an adjusting device for a vehicle component as defined by the independent claim is provided. The dependent claims define features of further embodiments.

According to embodiments, a pump for an adjusting device is provided which has a first output port, a second output port and at least one integrated check valve. The integrated check valve is arranged in a housing of the pump. The integrated check valve is located at the first output port or the second output port and is in direct communication with the respective output port. The integrated check valve is configured to receive fluid discharged from a pump chamber.

Such a pump offers various advantages. For illustration, the pump is configured to supply fluid to two supply ports of control valves or control valve assemblies without requiring a T-connector to couple the pump to two supply ports. The number of components and/or installation time required for installing the adjusting device may thereby be reduced. The pump is versatile because it can also be used in combination with normally open (NO) control valves, because leakage from inflatable chambers through the pump may be suppressed by the integrated check valve(s). The pump may have two integrated check valves which are associated with the first and second output port. The pump may have an even greater number of integrated check valves when the pump has a greater number of output ports.

An adjusting device according to an embodiment comprises a plurality of inflatable chambers and a pump configured to supply fluid to the at least one inflatable chamber. The pump comprises a housing, a first output port provided on the housing and a second output port provided on the housing, the second output port being different from the first output port. At least one of the first and second output ports has an integrated check valve disposed at the respective output port. The integrated check valve is arranged within the housing.

The integrated check valve may be in direct fluid communication with the respective output port, such that fluid can flow from the integrated check valve to the respective output port without passing another valve. The integrated check valve may be arranged such that it receives fluid discharged from a pump chamber, i.e. a working chamber of the pump.

The housing may comprise an end member which defines an end surface of the housing. The end member may define a first cavity associated with the first output port and a second cavity associated with the second output port, the second cavity being separated from the first cavity. The integrated check valve may be arranged in the first cavity or in the second cavity.

The first output port and the second output port may be formed on the end member. The first and second output ports may respectively be tubular ports which are integrally formed on the end member. The tubular ports may serve as connectors for tubes or other fluid guides.

The first output port may have a first integrated check valve and the second output port may have an second integrated check valve. The first integrated check valve may be arranged in the first cavity and the second integrated check valve may be arranged in the second cavity.

The first cavity and the second cavity may be arranged between an inner wall of the housing and the end member. The inner wall may have a valve seat for the integrated check valve. When two integrated check valves are provided, the inner wall may have a first valve seat for the first integrated check valve and a second valve seat for the second integrated check valve.

The pump may be configured to supply gas as a fluid. The integrated check valve may be configured such that a volume flow rate of the gas from the first output port through the integrated check is less than or equal to 0.02 ml/minute (0.02 milliliters per minute). When two integrated check valves are provided, the first integrated check valve and the second integrated check valve may be configured such that a volume flow rate of the gas from the first output port through the first integrated check valve and from the second output port through the second integrated check valve is less than or equal to 0.02 ml/minute.

The first integrated check valve may include a first resilient member and the second integrated check valve may include a second resilient member. The first and second resilient members may abut on the end member. The first integrated check valve may include a first seal member which is biased by the first resilient member in a direction away from the end member. The second integrated check valve may include a second seal member which is biased by the second resilient member in a direction away from the end member.

The pump may comprise a diaphragm and a valve member which define a pump chamber therebetween. The valve member may have an inlet valve configured to supply fluid to the pump chamber and an outlet valve configured to discharge fluid from the pump chamber. The outlet valve may be in fluid communication with the integrated check valve. The outlet valve may be configured to supply fluid from the pump chamber to an internal fluid chamber of the pump, and the integrated check valve may be configured to discharge fluid from the internal fluid chamber to the respective output port. The pump chamber may be separated from the integrated check valve(s).

The adjusting device may further comprise at least one valve module which is separate from the pump and which comprises a plurality of control valves. The at least one valve module comprises a first supply port and a second supply port. A first fluid guide may connect the first output port of the pump to the first supply port of the valve module. A second fluid guide may connect the second output port of the pump to the second supply port of the valve module.

The adjusting device may be a seat adjusting device configured to alter a contour of a seat surface. The seat adjusting device may be configured to alter an apex position and/or curvature of a lumbar support. The seat adjusting device may be configured to alter a curvature of a side support. An inflatable chamber of the at least one inflatable chamber may be mounted in a lumbar support region or in a side support region of the seat.

The fluid may be a gas. The fluid may be air. In other applications, the fluid may be a liquid.

The at least one inflatable chamber may be attached to a vehicle component.

According to another embodiment, there is provided a seat which includes the adjusting device of an embodiment.

Embodiments of the invention may be used for adjusting a component of a vehicle, in particular for adjusting vehicle seats. Embodiments of the invention may be used for adjusting a contour of a seat surface. Embodiments may be used for providing seat adjustments in automotive vehicle seats, without being limited thereto.

BRIEF DESCRIPTION OF DRAWINGS

Embodiments of the invention will be described with reference to the accompanying drawings, wherein like reference numerals refer to like elements.

DETAILED DESCRIPTION OF EMBODIMENTS

Exemplary embodiments of the invention will be described with reference to the drawings. While some embodiments will be described in specific contexts, such as automotive vehicle seating, the embodiments are not limited to this context. The features of the various embodiments may be combined with each other unless specifically stated otherwise. In any one embodiment described herein, the fluid may be a gas. The fluid may in particular be air. According to conventional terminology in this field, two elements are referred to as being "in direct communication" with each other when the fluid can directly flow between the two elements, without having to pass any valves.

According to embodiments, an adjusting device for vehicular applications is provided which uses a pump as a pressure fluid source. The pump includes a first output port and a second output port to supply fluid. The pump may include additional output ports. A check valve may be integrated into a housing of the pump and may be associated with at least one of the output ports, such that fluid can flow from the check valve to the associated output port without having to pass a valve. The check valve may be integrated into the portion of the housing at which the associated output port is formed. The pump may include a first integrated check valve which is associated with the first output port and a second integrated check valve which is associated with the second output port. The first integrated check valve may be arranged at the first output port and the second integrated check valve may be arranged at the second output port. Each integrated check valve may be configured such that, in operation of the pump, leakage of gas from the output port through the integrated check valve is less than a predetermined threshold and in particular less than or equal to 0.02 ml/min (0.02 milliliters/minute). If several integrated check valves are provided, the several integrated check valves may be configured such that overall leakage of gas from the associated output ports through the integrated check valves is less than or equal to 0.02 ml/min (0.02 milliliters/minute). Each integrated check valve may be formed by such that it can be easily inserted into or removed from a cavity that is defined by an end member at an axial end of the pump. Various effects are attained by an adjusting device having such a pump. For illustration, the pump may be used with a valve module which has plural fluid supply ports, without requiring dedicated T-connectors to connect a single pump output port to the plural supply ports. For further illustration, the pump may be used in combination with normally open (NO) control valves, because leakage from inflatable chambers through the pump may be suppressed by the integrated check valve(s).

Figure 1:
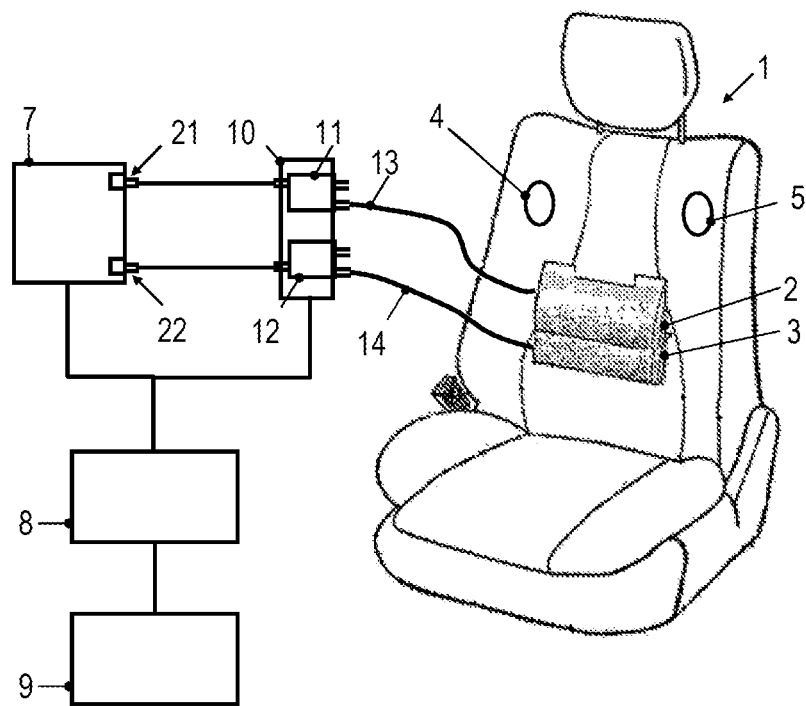
FIG. 1 is a schematic view of a seat having a seat adjusting device according to an embodiment.

FIG. 1 is a schematic view of a vehicle seat 1 having an adjusting device according to an embodiment. The adjusting device is configured as a seat adjusting device. For illustration rather than limitation, the seat 1 includes an adjustable lumbar support and an adjustable side support. The lumbar support includes inflatable fluid chambers, which are configured as inflatable bladders 2, 3. The bladders 2, 3 are configured to change their exterior dimensions when a fluid pressure in the respective bladder is adjusted. Bladders 2, 3 are provided at a lower portion of the backrest of the vehicle seat 1 and are offset relative to each other in a longitudinal direction of the backrest. By inflating or deflating all bladders 2, 3, the amount of curvature in the lower backrest portion may be adjusted. By inflating one of the bladders 2, 3 while deflating another one, the apex position may be shifted. Thereby, a four-way lumbar support device may be implemented. The side support unit includes a pair of bladders 4, 5 arranged on lateral sides of the seat 1. Some of the bladders 2-5 illustrated in FIG. 1 may also be omitted.

The adjusting device further includes a pressure fluid source configured as a pump 7, a valve module 10, a control circuit 8 and a manual control device 9. The pump 7 is configured to provide a fluid, in particular a gas, to the valve module 10 at positive pressure. The pump 7 has a first output port 21 with a first integrated check valve and a second output port 22 with a second integrated check valve. As will be explained in more detail with reference to FIG. 3 to FIG. 7, the first and second integrated check valves are integrated into a housing of the pump and are provided at the first and second output ports 21, 22. Leakage of gas from the tubes towards an interior of the pump 7 may be suppressed by the integrated check valves. The adjusting device may have a first tube 13 to connect the first output port 21 to a first supply port of the valve module 10 and a second tube 14 to connect the second output port 22 to a second supply port of the valve module 10. The valve module 10 is configured to receive the gas supplied by the pump 7 and to supply the gas to the bladders 2-5 installed in the seat 1. Actuation of the pump 7 and of the valve module 10 may be controlled by the control circuit 8 which is electrically connected to the pump 7 and the valve module 10. Control signals may be generated by the control circuit 8 in response to an adjustment made at the manual control device 9, for example. Alternatively, control signals may be generated by the control circuit 8 in response to a user identification or user profile received from a vehicular board network. The valve module 10 may include a plurality of control valves 11, 12. The control valves 11, 12 may be 3/2-way control valves (i.e. valves having three working ports and two positions) or 3/3-way control valves (i.e. valves having three working ports and three positions), without being limited thereto. At least one of the control valves 11, 12 may be a 4/4-way control valve (i.e., a valve having four working ports and four positions).

Figure 2:
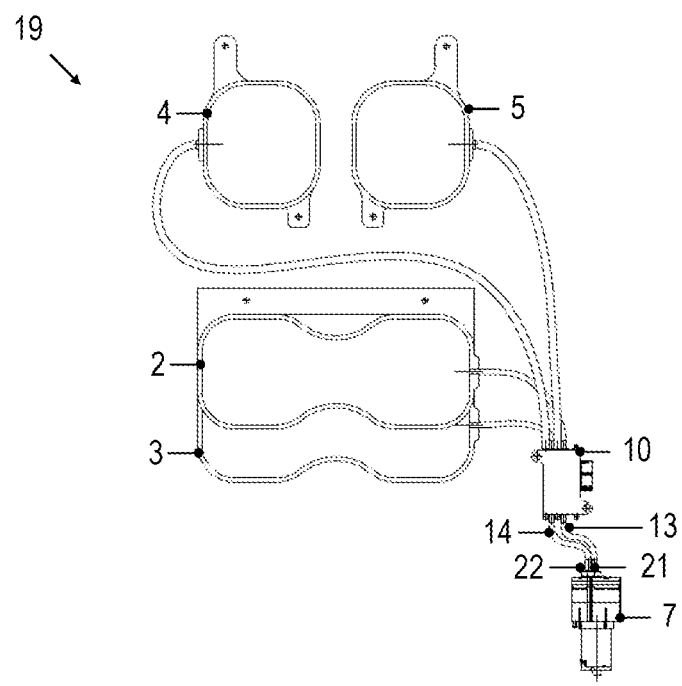
FIG. 2 is a view of a seat adjusting device according to an embodiment.

FIG. 2 illustrates an adjusting device 19 of an embodiment in a state in which it is not mounted to the seat 1.

The configuration of the pump 7 in adjusting devices according to exemplary embodiments will next be described with reference to FIG. 3 to FIG. 7.

Figure 3:
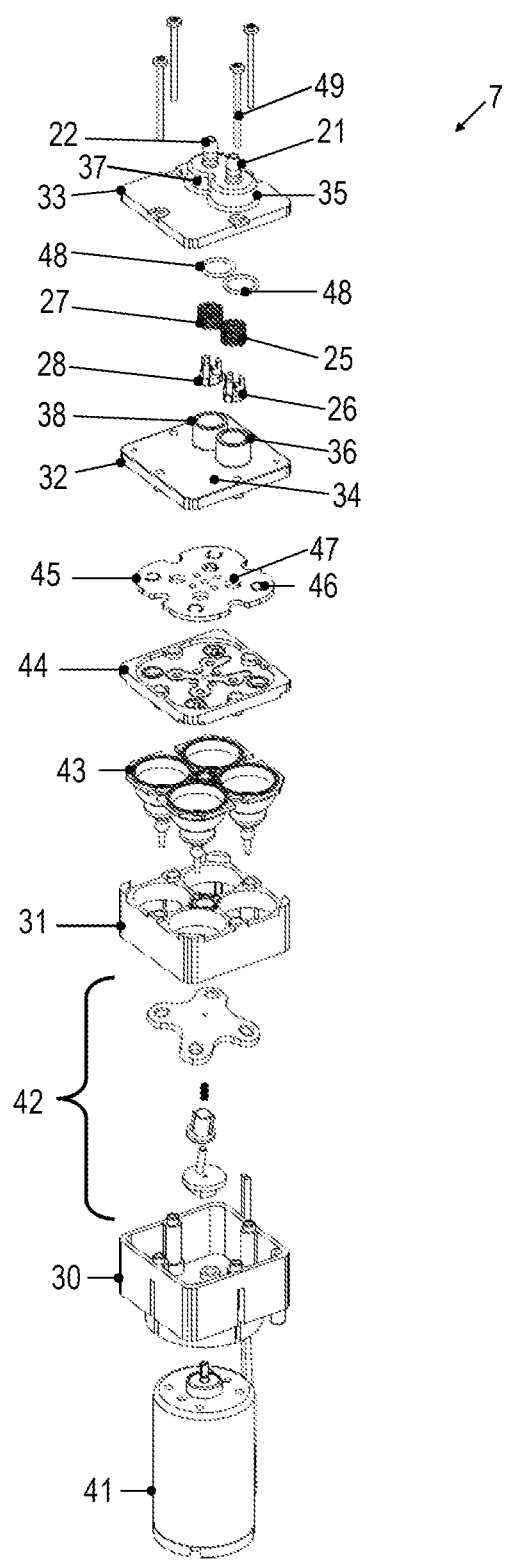
FIG. 3 is an exploded perspective view of a pump of a seat adjusting device according to an embodiment.
Figure 4:
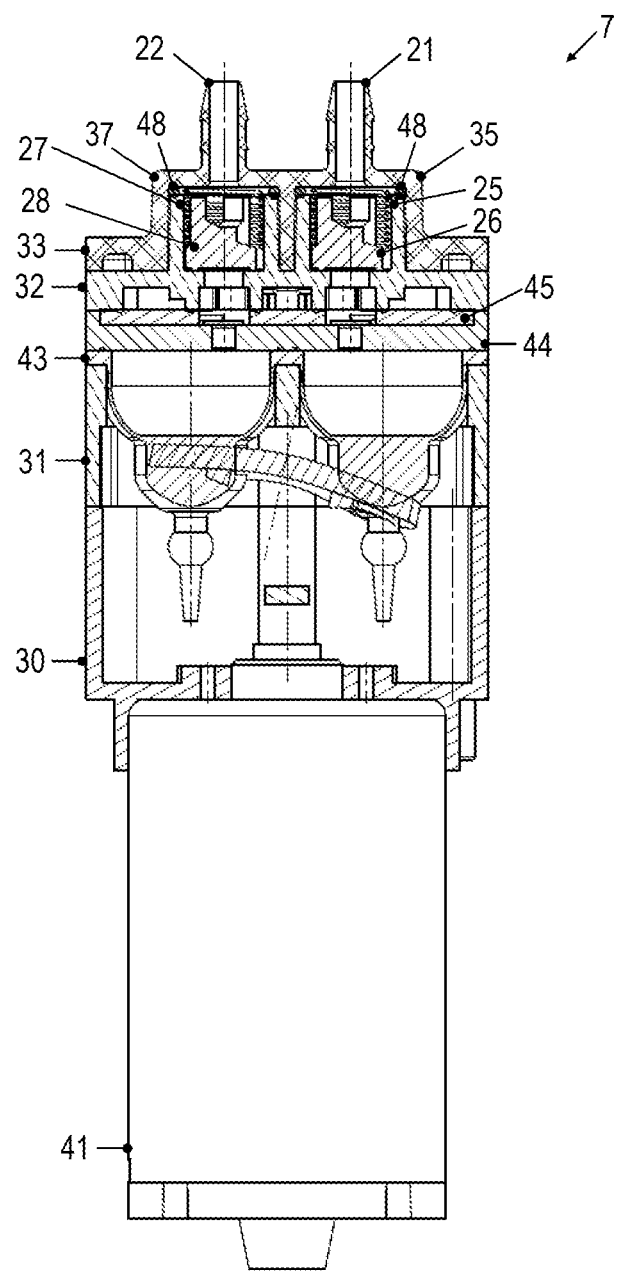
FIG. 4 is a sectional view of the pump of FIG. 3.
Figure 5:
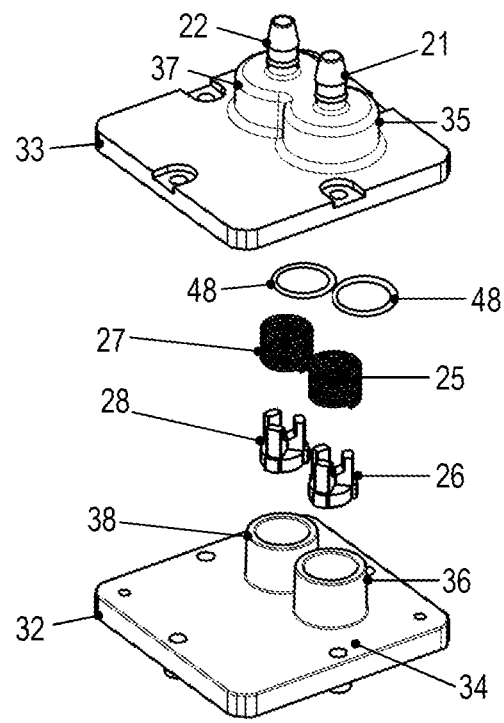
FIG. 5 is an enlarged exploded perspective view of components of the pump of FIG. 3.
Figure 6:
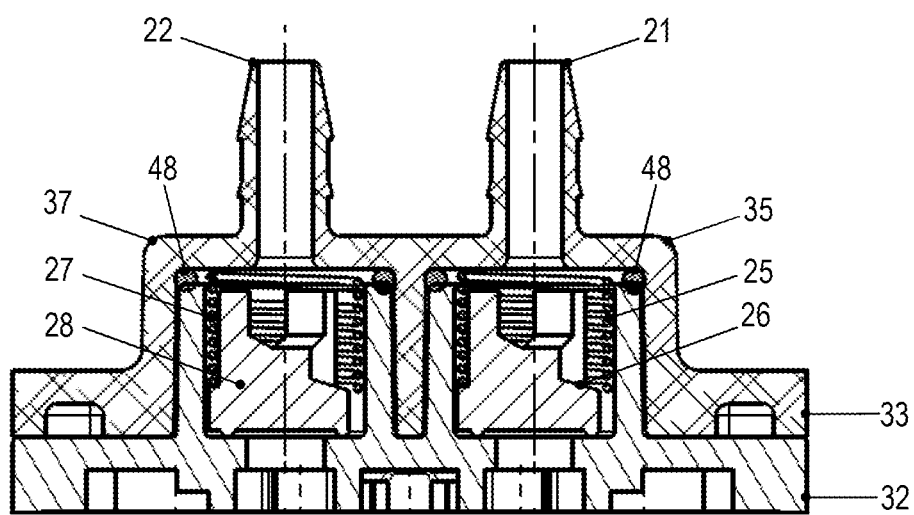
FIG. 6 is an enlarged sectional view of a portion of the pump of FIG. 3.

FIG. 3 is an exploded perspective view of a pump which may be used in an adjusting device of an embodiment. FIG. 4 is a sectional view of the assembled pump, the cross-section showing a plane which extends in an axial direction of the pump 7 and which passes through center axes of the first and second output ports 21, 22. FIG. 5 is an enlarged exploded view of components at an axial end of the pump 7 at which the first and second output ports 21, 22 are arranged. FIG. 6 is an enlarged sectional view of the axial end of the assembled pump 7, the cross-section showing a plane which extends in an axial direction of the pump 7 and which passes through center axes of the first and second output ports 21, 22.

The pump 7 generally includes a housing which may include plural housing sections 30-32 and an end member 33 which defines an axial end of the housing and on which the first output port 21 and the second output port 22 are provided. The pump 7 may be configured as a diaphragm pump, although other operation principles may be used in other embodiments. The pump 7 may include a diaphragm 43, a power drive 41, and a transmission 42 to convert a rotational movement of an output shaft of the power drive 41 into a reciprocating displacement of the diaphragm 43. A valve member may define inlet valves and outlet valves for the pump chamber. The valve member may include a frame 44 which support a layer 45 of resilient material. The layer 45 may have elastic sections 46, 47 which deform under positive or negative pressure differences across the elastic sections 46, 47. Gas may flow into the pump chamber through openings in the frame 44 which mate with the elastic section 46, 47 to provide inlet and outlet valve functionality, so that gas can flow into the pump chamber and be discharged from the pump chamber. The pump chamber may be defined in the space between the frame 44 of the valve member and the diaphragm 43. A housing section 32 may be arranged such that the motor 41, diaphragm 43 and valve member 46, 47 are all arranged on the same side of the housing section 32. On the opposing side of the housing section 32, the end member 33 is provided. Gas discharged from the pump chamber may flow through openings in the housing section 32 towards the output ports 21, 22 with integrated check valves. The end member 33 may be attached to the housing section 32.

The end member 33 of the housing defines an end surface of the pump 7. The end member 33 may define an axial end surface of the pump 7. The first output port 21 may be a first tubular output port which is integrally formed on the end member 33. The second output port 22 may be a second tubular output port which is integrally formed on the end member 33. The end member 33 may include a first portion 35 disposed at the first output port for receiving a first integrated check valve and a second portion 37 disposed at the second output port for receiving a second integrated check valve. The housing section 32 may have a first projection 36 which mates with the first portion 35 on the end member 33 to define a first cavity in which the first integrated check valve may be received. The housing section 32 may have a second projection 38 which mates with the second portion 37 on the end member 33 to define a second cavity in which the second integrated check valve may be received. The integrated first and second check valves are configured as passive valves.

To provide check valve functionality, a resilient bias member may be arranged in the cavity defined by the first portion 35 and the second projection 36. The resilient member may bias a sealing member against a surface 34 of the housing section 32 that faces the end member 33. For illustration, a ring-shaped section of the surface 34 located in the first projection 35 and another ring-shaped section of the surface 34 located in the second projection 36 may act as valve seats for the first and second integrated check valves.

To provide check valve functionality at the first output port 21 and/or the second output port 22, a resilient member and seal member may be used. For illustration, a first spring 25 and first seal member 26 may be disposed at the first output port 21. The first spring 25 and the first seal member 26 may be arranged in the cavity defined between the first portion 35 from which the first output port 21 projects and the first projection 36. The first spring 25 may bias the first seal member against the valve seat on the housing section 32. The first spring 25 may have an end which abuts on the first portion 35. The first spring 25 may have an opposite end which abuts on a ridge of the first seal member 26, thereby pressing the first seal member 26 against the surface 34 of the housing section 32. The first spring 25 may be arranged such that it spirals around at least a part of the first seal member 26. A second spring 27 and second seal member 28 may be disposed at the second output port 22. The second spring 27 and the second seal member 28 may be arranged in the cavity defined between the second portion 37 from which the second output port 22 projects and the second projection 38. The second spring 27 may bias the second seal member against the valve seat on the housing section 32. The second spring 27 may have an end which abuts on the second portion 37. The second spring 27 may have an opposite end which abuts on a ridge of the second seal member 28. The second spring 27 may be arranged such that it spirals around at least a part of the second seal member 28. The first check valve is disposed at the first output port 21 and is in direct fluid communication with the first output port 21. The second check valve is disposed at the second output port 22 and is in direct fluid communication with the second output port 22. The resilient member and/or seal member may be selected such that a rate of leakage through the check valve in a direction from the output port towards the pump chamber is less than or equal to 0.02 ml/min.

In operation of the pump 7, when the motor 41 is actuated, gas flows from the pump chamber through the outlet valves of the pump chamber and passes the openings of the housing section 32. When the pressure difference at an integrated check valve, i.e. the pressure difference between an internal pressure and external pressure at one of the output ports 21, 22, is such that the internal pressure is greater than the external pressure, the respective integrated check valve is opened to discharge fluid via the associated output port 21, 22. If the external pressure at the output port 21, 22 is greater than an internal pressure applied on the integrated check valve at an inner side of the pump, the integrated check valve remains in the closed state. The configuration of the integrated check valve is such that leakage in this state is less than a predetermined threshold. When the pump 7 supplies gas or another working fluid to the valve module 10 for distribution to inflatable chambers, unintended deflation of the inflatable chambers through the pump 7 may be suppressed by the first and second integrated check valves of the pump 7, even when the valve module 10 uses normally open (NO) control valves.

The pump 7 may include additional elements as appropriate, e.g. O-rings 48 for sealing internal channels or fasteners 49 to attach the various components of the housing to the power drive 41.

An O-ring 48 may be provided between the first projection 36 and an inner wall of the first portion 35 to provide a sealing therebetween. An O-ring 48 may be provided between the second projection 38 and an inner wall of the second portion 37 to provide a sealing therebetween. Other sealing members may be used.

Various other implementations of the first integrated check valve and the second integrated check valve may be used in various embodiments. For illustration, the resilient member and seal member may be integrally formed. The first and/or second integrated check valve may be mushroom valves (also referred to as poppet valves).

Figure 7:
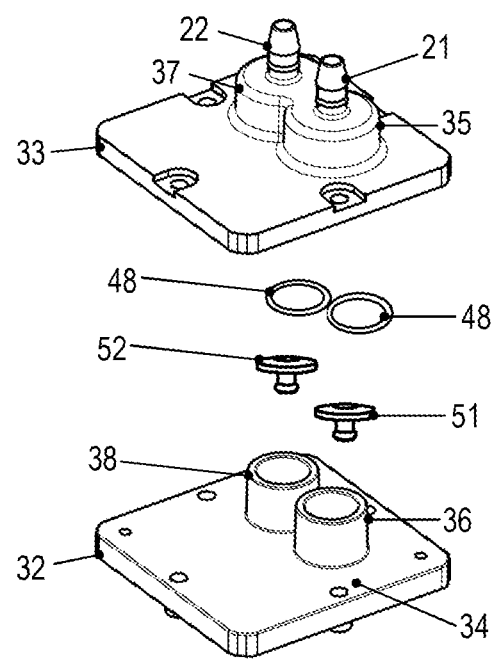
FIG. 7 is a partial exploded perspective view of components of a pump of an adjusting device of another embodiment.

FIG. 7 illustrates an exploded view of components of the pump 7 in another embodiment. In the implementation of FIG. 7, the first and second integrated check valves are respectively configured as mushroom valves. A first resilient member 51 is arranged in the first cavity defined by the first portion 35 and the first projection 36. The first resilient member 51 may be attached to the housing section 32. The first resilient member 51 may have a portion which acts as a sealing lip biased against the housing section 32. The sealing lip of the first resilient member 51 may be biased against the surface 34 of the housing section 32. A second resilient member 52 is arranged in the second cavity defined by the second portion 37 and the second projection 38. The second resilient member 52 may be attached to the housing section 32 and may have a configuration which is identical to that of the first resilient member 51.

The integrated check valve(s) can be easily assembled on the pump 7. Check valve functionality at the output ports 21, 22 is attained using members which can be interposed between the end member 33 of the pump housing and the housing section 32. If one of the two output ports 21, 22 is not required for a specific application, this output port can be easily closed. To this end, a gasket can be arranged in the respective cavity defined by the first portion 35 or the second portion 37 of the end member 33, so as to interrupt passage of fluid at the respective output port.

Adjusting devices according to embodiments have been described. Other configurations may be implemented in other embodiments. For illustration, while embodiments have been described in association with diaphragm pumps, a dual output port configuration with integrated check valves may also be used with pumps which operate according to other working principles.

While embodiments have been described in the context of seat adjusting devices configured to adjust a contour of a seat surface, the adjusting devices may generally be used for pneumatic adjustment of vehicle components. While embodiments have been described in the context of adjusting devices which have a valve module with plural control valves integrated into a housing, the dual output port pump with integrated check valves may also be used to supply fluid directly to inflatable chambers or to supply fluid to separate control valves which do not need to be arranged in a valve module.

While embodiments have been described in the context of air pumps, other fluids may be used as a working medium.

Embodiments of the invention may be used to supply gas or another working fluid to various types of inflatable chambers used in vehicles. The embodiments may in particular be used for seat adjustment of vehicle seats, such as automotive vehicle seats, without being limited thereto.

The invention claimed is:

1. An adjusting device for a vehicle component, the adjusting device comprising:
   at least one inflatable chamber; and
   a pump configured to supply fluid to the at least one inflatable chamber, the pump including
     a housing,
     a first output port integrally formed as one piece with the housing, and
     a second output port integrally formed as one piece with the housing, the second output port being different from the first output port,
     wherein at least one of the first and second output ports includes an integrated check valve configured to receive fluid discharged from a pump chamber, wherein the integrated check valve is arranged within the housing.

2. The adjusting device of claim 1, wherein the housing comprises an end member defining an end surface of the housing, the end member defining a first cavity associated with the first output port and a second cavity associated with the second output port, wherein the second cavity is separated from the first cavity and the integrated check valve is arranged in the first cavity or in the second cavity.

3. The adjusting device of claim 2, wherein the first output port and the second output port are formed on the end member.

4. The adjusting device of claim 2, wherein the first output port has a first integrated check valve and the second output port has a second integrated check valve, wherein the first integrated check valve is arranged in the first cavity and the second integrated check valve is arranged in the second cavity.

5. The adjusting device of claim 4, wherein the first cavity and the second cavity are arranged between an inner wall of the housing and the end member, the inner wall having a first valve seat for the first integrated check valve and a second valve seat for the second integrated check valve.

6. The adjusting device of claim 5, wherein at least one O-ring is disposed between the inner wall of the housing and the end member.

7. The adjusting device of claim 4, wherein the pump is configured to supply gas as the fluid, and further wherein the first integrated check valve and the second integrated check valve are configured such that a volume flow rate of the gas from the first output port through the first integrated check valve and from the second output port through the second integrated check valve is less than or equal to 0.02 ml/minute.

8. The adjusting device of claim 4, wherein the first integrated check valve includes a first resilient member and the second integrated check valve includes a second resilient member, and wherein the first and second resilient members abut on the end member.

9. The adjusting device of claim 8, wherein the first integrated check valve includes a first seal member biased by the first resilient member in a direction away from the end member, and wherein the second integrated check valve includes a second seal member biased by the second resilient member in a direction away from the end member.

10. The adjusting device of claim 1, wherein the pump comprises a diaphragm and a valve member that define the pump chamber therebetween, the valve member having an inlet valve configured to supply fluid to the pump chamber and an outlet valve configured to discharge fluid from the pump chamber, and wherein the outlet valve is in fluid communication with the integrated check valve.

11. The adjusting device of claim 1, further comprising a valve module separate from the pump and having a plurality of control valves, the valve module including a first supply port and a second supply port, a first fluid guide connecting the first output port of the pump to the first supply port of the valve module, and a second fluid guide connecting the second output port of the pump to the second supply port of the valve module.

12. The adjusting device of claim 1, wherein the adjusting device is an adjusting device for a seat.

13. The adjusting device of claim 1, wherein the adjusting device is a seat adjusting device configured to alter a contour of a seat surface of the seat.

14. The adjusting device of claim 13, wherein the at least one inflatable chamber is mounted in a lumbar support region or in a side support region of the seat.

15. A vehicle seat comprising:
at least one inflatable chamber; and
a pump configured to supply fluid to the at least one inflatable chamber, the pump including
a housing,
a first output port integrally formed as one piece with the housing, and
a second output port integrally formed as one piece with the housing, the second output port different from the first output port,
wherein at least one of the first and second output ports includes an integrated check valve configured to receive fluid discharged from a pump chamber, wherein the integrated check valve is arranged within the housing.

16. An adjusting device for a vehicle component, the adjusting device comprising:
at least one inflatable chamber; and
a pump configured to supply fluid to the at least one inflatable chamber, the pump including
a housing, wherein the housing includes an end member defining an end surface of the housing,
a first output port integrally formed as one piece with the end member, and
a second output port integrally formed as one piece with the end member, the second output port being different from the first output port,
wherein at least one of the first and second output ports includes an integrated check valve configured to receive fluid discharged from a pump chamber, wherein the integrated check valve is arranged within the housing.

17. The adjusting device of claim 16, wherein the end member defines a first cavity associated with the first output port and a second cavity associated with the second output port, wherein the second cavity is separated from the first cavity and the integrated check valve is arranged in the first cavity or in the second cavity.

* * * * *